(12) United States Patent
Kuo et al.

(10) Patent No.: US 8,059,328 B1
(45) Date of Patent: Nov. 15, 2011

(54) ELECTROWETTING DISPLAY DEVICES

(75) Inventors: Shu-Wei Kuo, Taipei County (TW);
Jyh-Wen Shiu, Hsinchu County (TW);
Wei-Yuan Cheng, Taipei County (TW);
Yun-Sheng Ku, Miaoli County (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 12/886,517

(22) Filed: Sep. 20, 2010

(51) Int. Cl.
*G02B 26/00* (2006.01)

(52) U.S. Cl. ............................. 359/290; 359/291

(58) Field of Classification Search .......... 359/290–292, 359/295, 298
See application file for complete search history.

(56) References Cited

U.S. PATENT DOCUMENTS

| | | | |
|---|---|---|---|
| 6,967,763 | B2 | 11/2005 | Fujii et al. |
| 7,440,071 | B2 | 10/2008 | Hsieh et al. |
| 2007/0019006 | A1 | 1/2007 | Marcu et al. |
| 2008/0037105 | A1 | 2/2008 | Van Bommel et al. |
| 2008/0297030 | A1 | 12/2008 | Zhang et al. |
| 2008/0297880 | A1 | 12/2008 | Steckl et al. |
| 2008/0303994 | A1 | 12/2008 | Jeng et al. |
| 2009/0002806 | A1 | 1/2009 | Skipor et al. |
| 2010/0033798 | A1* | 2/2010 | Wang et al. ............... 359/290 |
| 2010/0067093 | A1 | 3/2010 | Feil et al. |
| 2010/0128015 | A1 | 5/2010 | Feenstra et al. |

FOREIGN PATENT DOCUMENTS

| | | |
|---|---|---|
| WO | WO 03/071347 A1 | 8/2003 |
| WO | WO 2007/064141 A1 | 6/2007 |
| WO | WO 2009/071676 A1 | 6/2009 |

OTHER PUBLICATIONS

J. Heikenfeld et al., "Demonstration of Fluorescent RGB Electrowetting Devices for Light Wave Coupling Displays," 12th Intl. Conf. Electrolum., 2004, pp. 302-305, Toronto.
Andrew J. Steckl et al., "Light Wave Coupled Flat Panel Displays and Solid-State Lighting Using Hybrid Inorganic/Organic Materials," OSA Journal of Display Technology, Sep. 2005, pp. 157-166, vol. 1, No. 1, IEEE, US.
Andrea Giraldo et al., "Transmissive Electrowetting-Based Displays for Portable Multi-Media Devices," SID Symposium Digest of Technical Papers, Jun. 2009, pp. 479-482, vol. 40, Issue 1, SID, US.
J. Heikenfeld et al., "Intense Switchable Fluorescence in Light Wave Coupled Electrowetting Devices," Applied Physics Letters, 2005, 3 pages, American Institute of Physics, US.
Robert A. Hayes et al., "Video-Speed Electronic Paper Based on Electrowetting," Letters to Nature, 2003, 4 pages, Nature Publishing Group, US.

* cited by examiner

*Primary Examiner* — Scott J Sugarman
*Assistant Examiner* — Brandi Thomas

(57) ABSTRACT

Electrowetting devices (EWD) are presented. The electrowetting device includes a first substrate and an opposing second substrate with a polar fluid layer and a non-polar fluid layer interposed therebetween. A first transparent electrode is disposed on the first substrate. A second electrode is disposed on the second substrate. A first partition structure is disposed on the first substrate; thereby defining a plurality of color sub-pixels. A dye and/or a pigment substance is doped in one of the polar fluid layer and the non-polar fluid layer. A luminescence substance is doped in one of the polar fluid layer and the non-polar fluid layer. An emission module (also known as an excitation module) is disposed underlying the bottom of the first substrate. The colors of the non-polar fluid layer in the neighboring sub-pixels are different.

19 Claims, 19 Drawing Sheets

ELECTROWETTING DISPLAY DEVICES

BACKGROUND OF THE INVENTION

1. Field of the Invention

The invention relates to electrowetting devices.

2. Description of the Related Art

Electrowetting display devices are rendered images in accordance with electrowetting or electrocapillary techniques. Briefly, the free surface energy of some fluids is changed due to the electric field effects such that distribution area of the fluids can change along with the electric field effects.

U.S. Pat. No. 6,967,763, the entirety of which is hereby incorporated by reference, discloses an electrowetting display device. A non-polar fluid in the electrowetting display device converges due to the electrowetting effect; thereby controlling a bright state and/or a dark state of a pixel.

FIGS. 1A and 1B are cross sections respectively illustrating a voltage off-state and a voltage on-state for a conventional electrowetting display. Referring to FIG. 1A, a conventional electrowetting display 10 includes a substrate 11 with a patterned pixel electrode 12 disposed thereon. A dielectric layer 13 having a hydrophobic surface is disposed on the patterned pixel electrode 12. Patterned bank structures 14 are disposed on the dielectric layer 13; thereby defining each of the pixel regions. An colored non-polar fluid 15a containing a black dye and transparent polar fluid 16 are disposed in each pixel region. When the applied voltage is "off", the colored non-polar fluid 15a is spread on the hydrophobic surface in a pixel region; thereby rendering the pixel region to display a dark state.

On the contrary, when the applied voltage is "on", the transparent polar fluid 16 is affected by electrowetting force to approach the pixel electrode and the colored non-polar fluid 15b is converged far away from the pixel electrodes 12. A large portion of the pixel region is thus exposed; thereby rendering the pixel region to display a bright state, as shown in FIG. 1B.

FIG. 2 is a cross section schematically illustrating a conventional single-layered color electrowetting display device. In FIG. 2, a single-layered color electrowetting display device 50 includes a first substrate 51 and s second substrate 61 opposing to each other. The first substrate 51 includes patterned electrodes 52 corresponding to each of sub-pixel regions. A reflective layer 53 is disposed on the patterned electrode 52. A partition structure 54 is disposed on the reflective layer 53; thereby defining an array of sub-pixels. A black-dye containing first fluid 55 is disposed on the patterned electrodes 52 in each of the sub-pixels. A transparent second fluid 56 is filled between the first substrate 51 and the second substrate 61. A color filter 62 including red 62R, green 62G, and blue 62B color units is disposed on the second substrate 61. Each of the red 62R, green 62G, and blue 62B color units correspond to a sub-pixel region. A seal structure 70 is formed on the peripheral region of the display device encapsulating the first substrate 51 and the second substrate 61. A common electrode 65 contacts the second fluid 50. The surface tension of the first fluid 55 and the second fluid 56 are changed due to the electrical field generated between the common electrode 65 and electrodes 52 in each sub-pixel region; thereby rendering display images. Specifically, whether the ambient light passing through the display device is reflected or absorbed is dependant upon shrinkage or stretching of the black non-polar fluid. The reflective light passing through the color filter on the first substrate is converted to a desired color of light to achieve full color display.

WO 2003/071347, the entirety of which is hereby incorporated by reference, discloses a color electrowetting display structure. FIG. 3 is a cross section of a tri-layered color electrowetting display device. Referring to FIG. 3, in the structure of the tri-layered color electrowetting display device 100, a partition structure 113 defines a plurality of sub-pixel structures between the upper and lower substrate. A polar fluid 106 and corresponding two different colored non-polar ink oils 105W, 105C, 105Y, and 105M are filled to each sub-pixel structure, wherein the polar fluid is sandwiched between two non-polar ink oils such that a tri-layered structure consisting of ink oil, polar fluid and ink oil is presented between the upper and lower substrates. A color filter 121 is disposed on the upper substrate. The color filter has a complementary color with the other two different colors of the non-polar ink oils. During operation, different bias are respectively applied to the electrodes 112 and 132-137, and whether the different non-polar ink oils are shrunk or stretched can affect incident light 116 by the reflective plate 122 or absorbance by different colored non-polar ink oils 105W, 105C, 105Y, and 105M. Thus, the reflected light passing through the color units 121M, 121C, and 212Y of the color filter render desired light colors.

The conventional single-layered color electrowetting display structure, however, uses color filters associated with black non-polar fluid (such as ink oil). A part of the incident light is absorbed by the color filter, lowering the optical performance of the display due to the light absorption of the color filter. Contrast ratio and brightness of the display images are also reduced. In addition, alignment between the color filter substrate and the lower substrate is difficult that fabrication complexity of the display device is also increased. On the other hand, although a conventional tri-layered color electrowetting device can effectively improve color saturation. However, the tri-layered structure is complex and the alignment process of fabrication is tedious that could make the production costs very high.

Other conventional electrowetting display technologies, such as U.S. Pub. No. 2008/0297030 and U.S. Pub. No. 2009/0002806, disclose self-emission type electrowetting display. By utilizing light emission media (e.g., electroluminescent particles or quantum dots), a self illuminating electrowetting display can be implemented. Additional similar stacks of layers may be added to provide a color display. U.S. Pub. No. 2010/0033798, the entirety of which is hereby incorporated by reference, discloses an electrowetting display device with a phosphor layer transforming short-wavelength light into different colored lights.

BRIEF SUMMARY OF THE INVENTION

Some embodiments of the disclosure provide an electrowetting device, comprising: a first substrate and an opposing second substrate with a polar fluid layer and a non-polar fluid layer interposed therebetween; a first transparent electrode disposed on the first substrate; a second electrode disposed on the second substrate; a first partition structure disposed on the first substrate, to define a plurality of color sub-pixels; an array of pixel regions consisting of a set of primary color sub-pixels, wherein each sub-pixel corresponds to one of the non-polar fluid layers with different colors, and each of the non-polar fluid layers is isolated from each other; a dye and/or a pigment doped in one of the polar fluid layer and the non-polar fluid layer; a luminescence substance doped in one of the polar fluid layer and the non-polar fluid layer; and an emission module (also known as an excitation module) disposed underlying the bottom of the device.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1A:
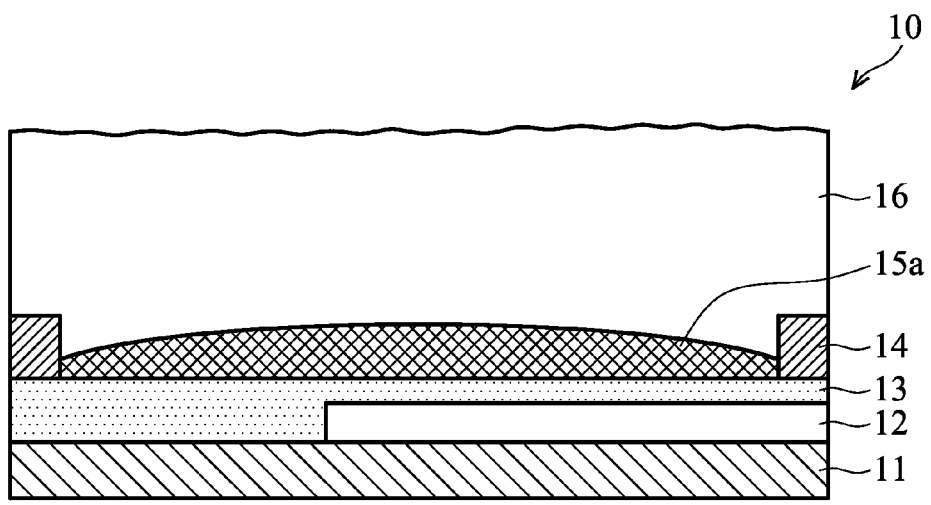
FIGS. 1A and 1B are cross sections respectively illustrating a voltage off-state and a voltage on-state for a conventional electrowetting display.
Figure 1B:
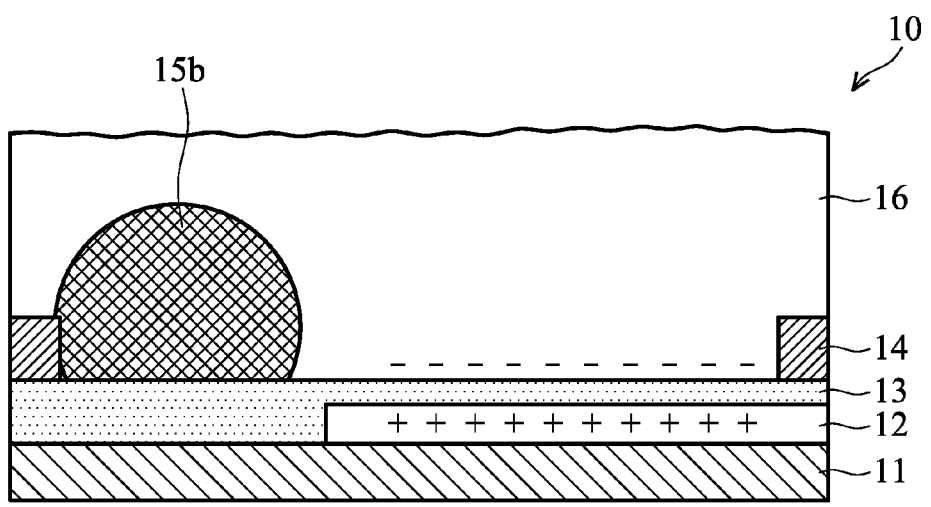
Figure 2:
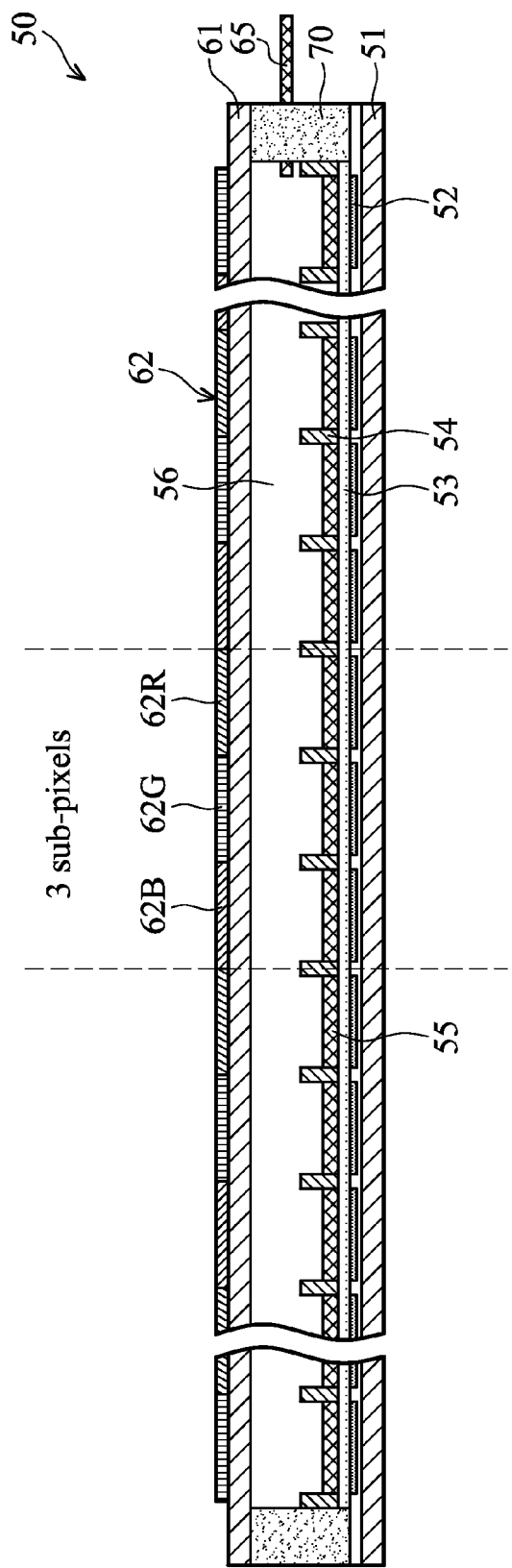
FIG. 2 is a cross section schematically illustrating a conventional single-layered color electrowetting device.
Figure 3:
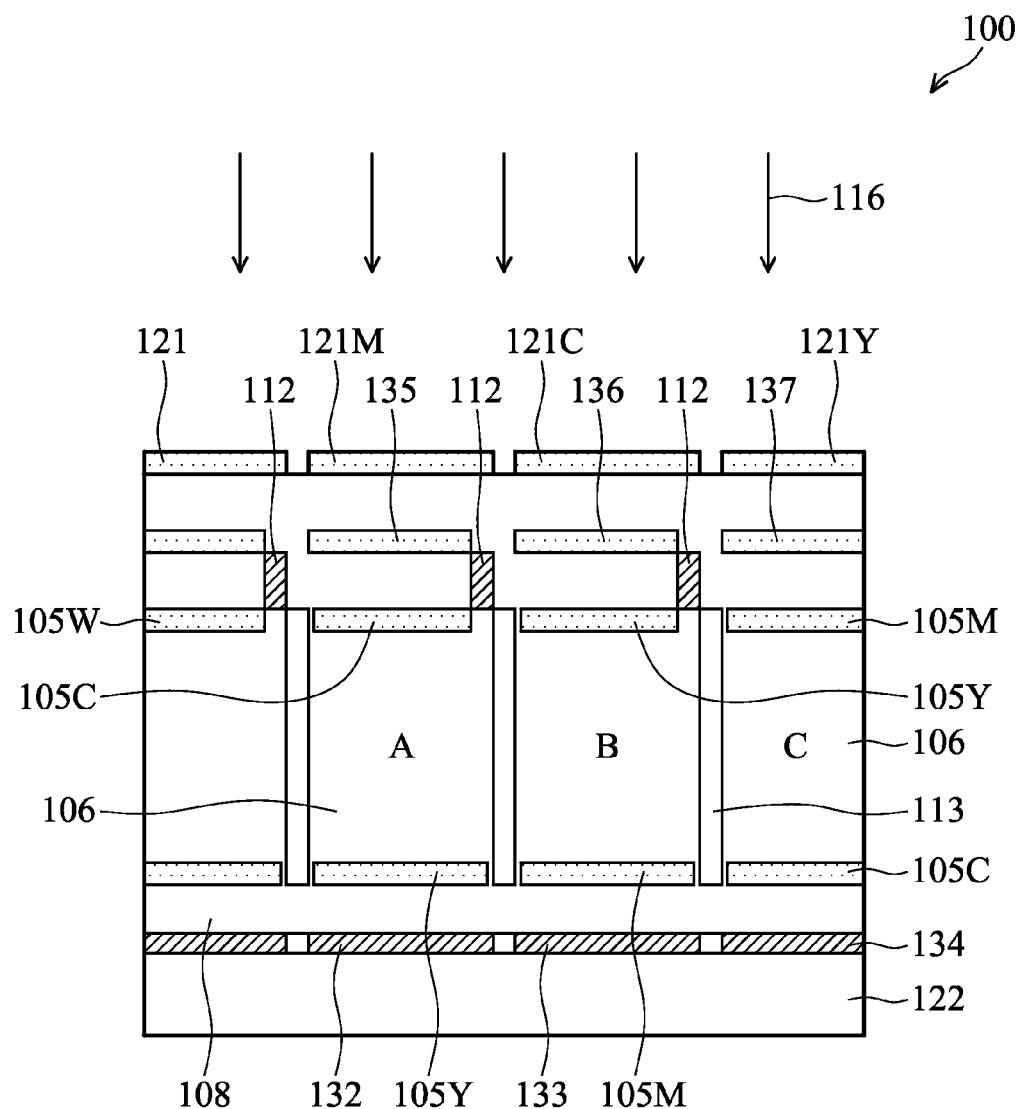
FIG. 3 is a cross section of a tri-layered color electrowetting display device.

It is to be understood that the following disclosure provides many different embodiments, or examples, for implementing different features of various embodiments. Specific examples of components and arrangements are described below to simplify the present disclosure. These are merely examples and are not intended to be limiting. In addition, the present disclosure may repeat reference numerals and/or letters in the various examples. This repetition is for the purpose of simplicity and clarity and does not in itself indicate a relationship between the various embodiments and/or configurations discussed. Moreover, the formation of a first feature over or on a second feature in the description that follows may include embodiments in which the first and second features are formed in direct contact or not in direct contact.

Embodiments of the invention are directed to electrowetting devices for which display is achieved by electrically changing surface characteristics of polar fluid in each pixel region. More specifically, novel geometric areas and arrangements of the color sub-pixels of the color electrowetting device are provided to improve image quality and reduce fabrication complexity and production costs of the color electrowetting device.

Figure 4:
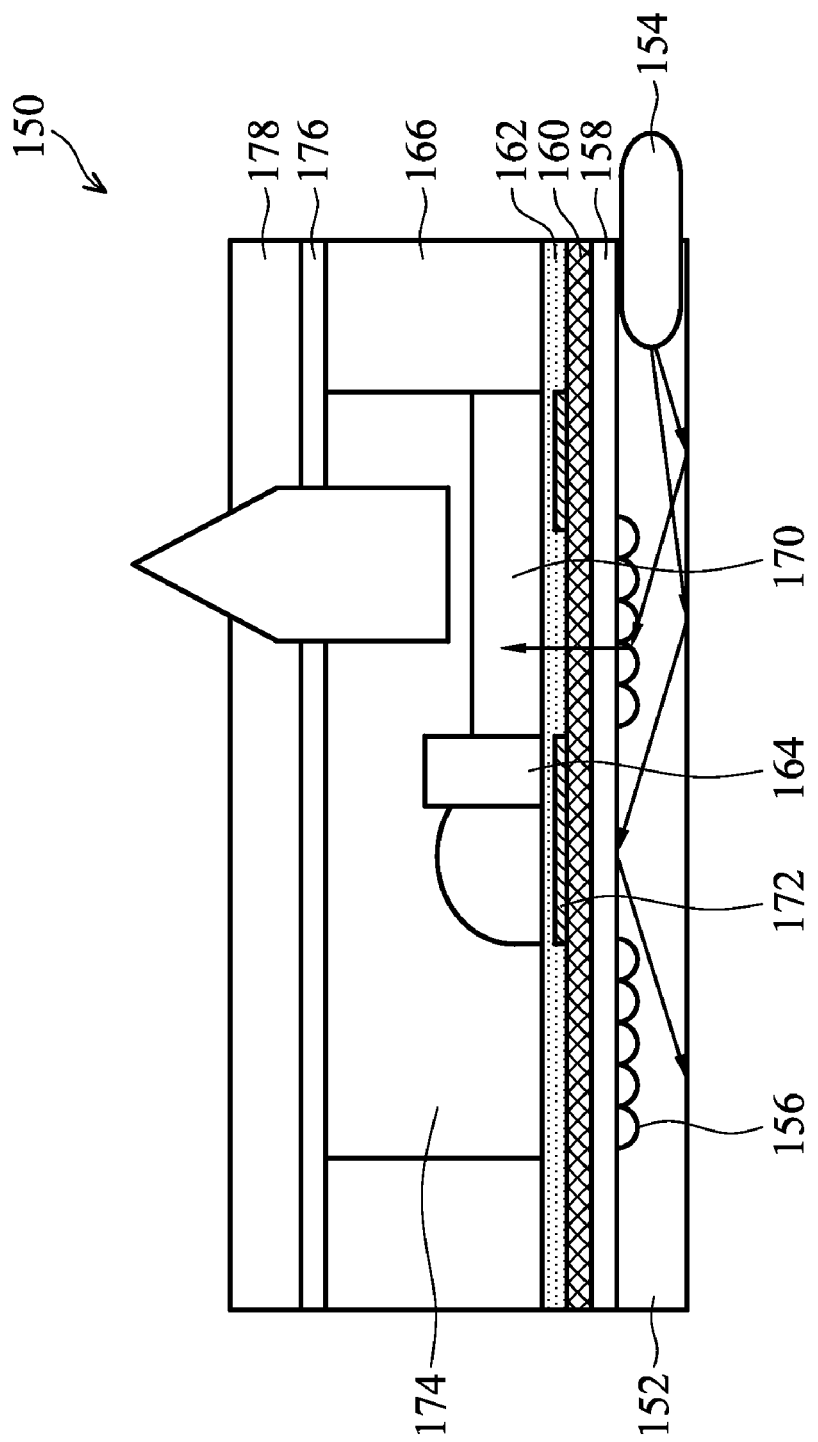
FIG. 4 is a cross section of an embodiment of an electrowetting device.

FIG. 4 is a cross section of an embodiment of an electrowetting device. Referring to FIG. 4, an electrowetting device 150 includes a first substrate 152 and an opposing second substrate 178 with a polar fluid layer 174 and a non-polar fluid layer 170 interposed therebetween. The first and second substrates are tightly sealed by a sealer 166 at a peripheral region of the electrowetting device. A first transparent electrode 158 is disposed on the first substrate 152. A dielectric layer 160 is disposed on the transparent electrode 158. A hydrophobic layer 162 is disposed on the dielectric layer 160. A second electrode 176 is disposed on the second substrate 178. A first partition structure 164 is disposed on the first substrate 152; thereby defining a plurality of color sub-pixels. Both the dyes and/or pigments and luminescence substances are doped in the non-polar fluid layer 170. A emission module (also known as an excitation module) which includes a light source 154 disposed on the lateral side of the first substrate 152 provides light or other electromagnetic radiation absorbed by the dye and/or pigment or emitted by the luminescence substance. Alternatively, the emission module can be an active light source such as an OLED, disposed underlying the first substrate. A main wavelength of the emission module may be less than 500 nm or 450 nm, but other continuous light sources with lower intensity are also possible. Additionally, a control module (not shown) may be provided to switch between transmission, reflection, and self-emission display modes of the electrowetting device. The first substrate can act as a waveguide where light is multi-reflected and transmitted through a specific area 156 so that the luminescence substance can be transmitted to the second substrate. In another embodiment, a light shield layer 172 (e.g., a black matrix, BM) is disposed underlying an area of shrunken non-polar fluid layer.

In one embodiment, a color display media which can absorb a specific range wavelength of light or emit a specific range wavelength of light different from that of the light source module is doped in one of the polar fluid layer and the non-polar fluid layer. In another embodiment, both dyes and/or pigments which can absorb a specific range wavelength of light and luminescence substances which can emit a specific range wavelength of light different from that of the light source module are doped in one of the polar fluid layer and the non-polar fluid layer. In this case, optical characteristics of the dyes and/or pigments and luminescence substances need to match each other, to prevent the luminescence substances emission of light to be absorbed by the dyes and/or pigments. In various embodiments, the light absorption substances and light emission substances can be doped in different fluid layers, respectively. Alternatively or optionally, the light absorption substances and light emission substances can be doped in different non-polar fluid layers. After having been aligned, the same pixel with different aligned color non-polar fluid layers can be viewed by users. Note that if one fluid layer contains both the light absorption substances and light emission substances, the contents of both the light absorption substances and light emission substances need to be controlled within a specific range to prevent electrons from transferring between the light absorption substances and light emission substances, reducing efficiency of light emission. For example, a molar concentration of the dye and/or the pigment is less than a molar concentration of the luminescence substance.

In other structural embodiments, an exciting light source layer is disposed underlying the electrowetting device. The exciting light source layer can be an emission layer which emits an invisible wavelength range of light. The exciting light source can be disposed at the lateral side of the electrowetting device. By utilizing a wave guide, the exciting light can be effectively transmitted to the displaying area. When the non-polar fluid is shrunk, the exciting light is still emitted from the exciting light source. A light shield layer is disposed underlying a shrunken area of the non-polar fluid layer. A UV cut film or other materials with suitable refraction indices can be further used to prevent a user's eyes from being damaged by the short wavelength light.

Figure 5A:
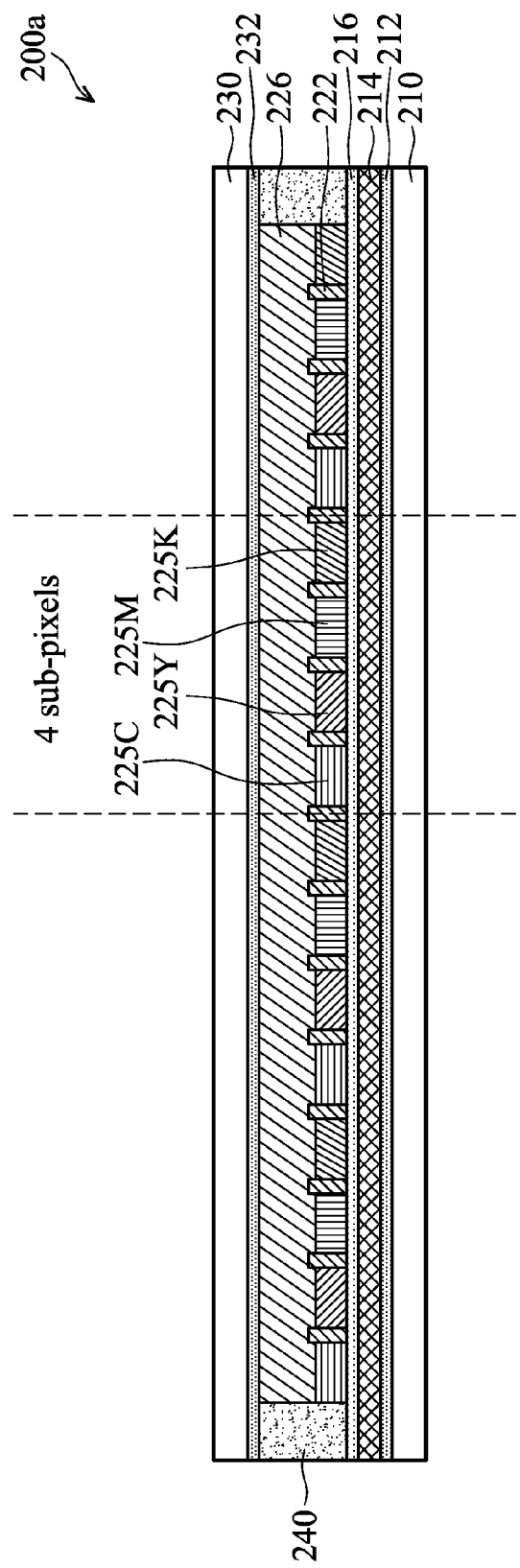
FIGS. 5A-5G are cross sections illustrating various embodiments of electrowetting devices.

FIG. 5A is a cross section illustrating another embodiment of an electrowetting device of the present disclosure. Referring to FIG. 5A, a single-layered color electrowetting device 200a includes a first substrate (lower substrate) 210 and a second substrate (upper substrate) 230 opposing to each other. The first substrate 210 includes patterned pixel electrodes 212 corresponding to each of sub-pixel regions. The pixel electrodes 212 can be made of indium tin oxide (ITO) or indium zinc oxide (IZO) with a thickness approximately in a range between 0.1 μm and 1 μm. The geometric structure of the pixel electrodes 212 can be a rectangular, a square, a triangle, a circle, a trapezoid, or an elliptical geometric structure. According to another embodiment of the invention, a reflective layer is selectively disposed on the second substrate 230, or alternatively interposed between the transparent pixel electrode 212 and the first substrate 210. The reflective layer can be made of aluminum, titanium dioxide, or zirconium dioxide.

A dielectric layer 214 is disposed on the patterned pixel electrode 212. According to one embodiment of the invention, the dielectric layer is made of parylene, SiOx, SiNx, poly(vinyldiene fluoride), TiO2, or ZrO2, with a thickness approximately in a range between 0.1 μm and 1 μm. Moreover, a hydrophobic layer 216 may be further disposed on the dielectric layer 214 to create a hydrophobic surface thereon. The hydrophobic layer 216 can be made of a fluorine-containing hydrophobic polymer or a carbide-containing hydrophobic polymer, with a thickness approximately in a range between 0.1 μm and 1 μm.

A partition structure 222 is disposed on the hydrophobic layer 216; thereby defining an array of multiple sub-pixels. The partition structure 222 can be made of a photoresist with a thickness approximately in a range between 5 μm and 10 μm.

A plurality of non-polar fluid layers 225C, 225Y, 225M, and 225K corresponding to different colors are disposed on the hydrophobic layer 216 of each sub-pixel region. The non-polar fluid layer can be made of decane, dodecane, or tetradecane, with a thickness approximately in a range between 1 μm and 10 μm. Alternatively, the non-polar fluid layers 225C, 225Y, 225M, and 225K include primary colors (such as RGBK or CYMK) of dyes or pigments. A transparent polar fluid 226 is filled between the first substrate 210 and the second substrate 230. The transparent polar fluid layer 226 can be made of water, a sodium chloride solution, or a potassium chloride solution with a thickness approximately in a range between 30 μm and 250 μm. A seal structure 240 is formed on the peripheral region of the display device encapsulating the first substrate 210 and the second substrate 230. A common electrode 232 contacts the second fluid 226. The common electrode 232 can be made of indium tin oxide (ITO) or indium zinc oxide (IZO) with a thickness approximately in a range between 0.1 μm and 1 μm. The surface of the transparent polar fluid 226 approaches the hydrophobic layer 216 due to the electrical field generated between the common electrode 232 and the electrodes 212 in each sub-pixel region. The non-polar fluid is pushed away from the pixel electrodes 212 and becomes cohered; thereby rendering display images. Specifically, whether the ambient light passing through the electrowetting device is reflected or absorbed can be controlled due to shrinkage or stretching of the color non-polar fluids in each sub-pixel. Different colored sub-pixels can be separately driven to display desired colors in each pixel; thereby achieving full-color display effect.

According to an embodiment of the invention, the color electrowetting device 200a is composed of an array of a plurality of pixels. Each pixel includes multiple (e.g., four) primary color sub-pixels. The shape of the sub-pixel can comprise a rectangular, a hexagonal, a square, a circular, a triangular, a trapezoid, or an elliptical shape. In one embodiment of the invention, the primary color sub-pixels comprise a black sub-pixel, a red sub-pixel, a green sub-pixel, and a blue sub-pixel. In another embodiment of the invention, the primary color sub-pixels comprise a black sub-pixel, a yellow sub-pixel, a magenta sub-pixel, and a cyan sub-pixel. Each sub-pixel corresponds to a non-polar fluid layer with different colors, and each of the different colored non-polar fluid layers is separated from each other. Adjacent sub-pixels have different colored non-polar fluid layers.

In a structural embodiment of the color electrowetting device, a polar fluid and different colored non-polar ink oils are filled between the upper and lower substrates, wherein the different colored non-polar ink oils are separated by a partition structure. Different colored non-polar ink oils in adjacent sub-pixels are consequently composed of an array of sub-pixels. Whether a specific spectrum of the incident light passing through the electrowetting device is reflected or absorbed can be control due to shrinkage or stretching of the color non-polar ink oil; thereby displaying different colored lights.

Figure 5B:
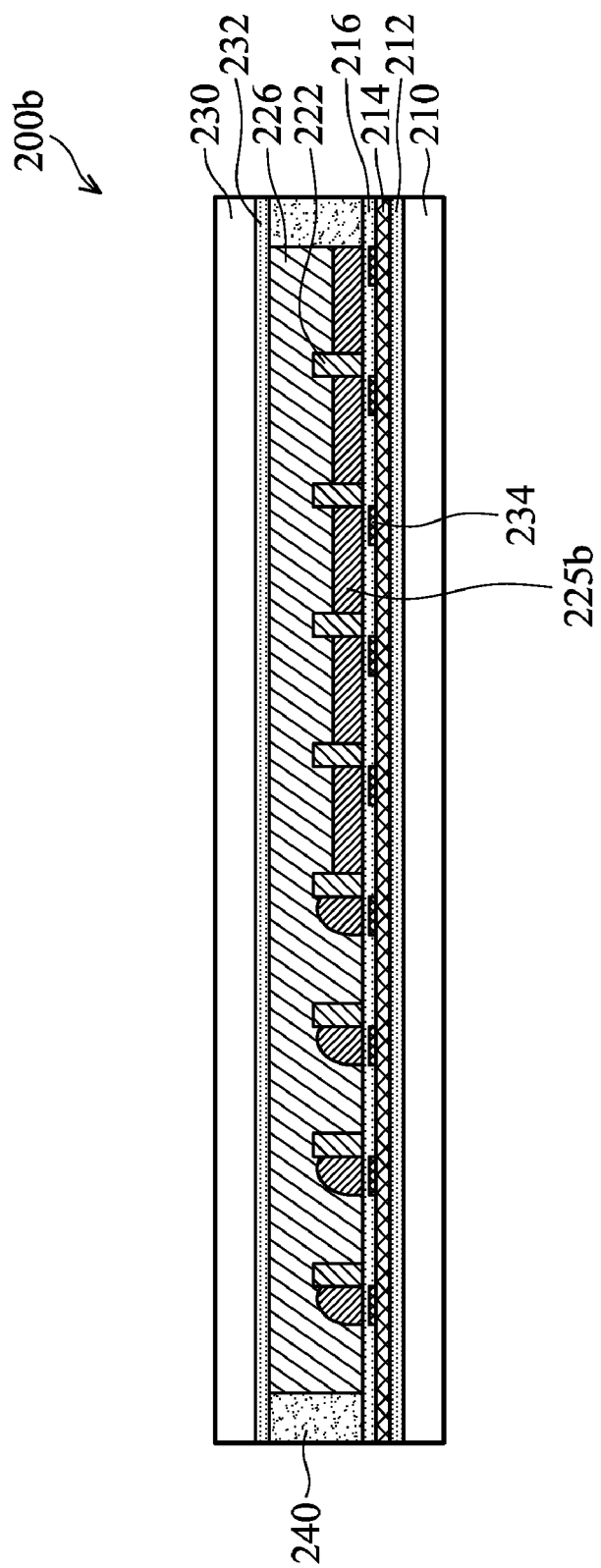

FIG. 5B is a cross section illustrating another embodiment of an electrowetting device 200b of the present disclosure. Referring to FIG. 5B, a single-layered color electrowetting device 200b includes a first substrate (lower substrate) 210 and a second substrate (upper substrate) 230 opposing to each other. The first substrate 210 includes a excitation module, and patterned pixel electrodes 212 corresponding to each of sub-pixel regions. A first dielectric layer 214 is disposed on the patterned pixel electrode 212. Moreover, a hydrophobic layer 216 can be further disposed on the dielectric layer 214 to create a hydrophobic surface thereon. The hydrophobic layer 216 can be made of a fluorine-containing hydrophobic polymer or a carbide-containing hydrophobic polymer, with a thickness approximately in a range between 0.1 μm and 1 μm.

A partition structure 222 is disposed on the hydrophobic layer 216; thereby defining an array of multiple sub-pixels. The partition structure 222 can be made of a hydrophilic photoresist with a thickness approximately in a range between 5 μm and 10 μm. A plurality of non-polar fluid layers 225b corresponding to different colors are disposed on the hydrophobic layer 216 of each sub-pixel region. The non-polar fluid layer can be made of decane, dodecane, or tetradecane, with a thickness approximately in a range between 1 μm and 10 μm. Alternatively, the non-polar fluid layers 225b include primary colors (such as RGBK or CYMK) of dyes and/or pigments. Luminescence substances can also be doped in the non-polar fluid layers 225b. A light shield layer 234 (e.g., a black matrix layer) is disposed underlying a shrunken area of the non-polar fluid layer. A transparent polar fluid 226 is filled between the first substrate 210 and the second substrate 230. The transparent polar fluid layer 226 can be made of water, a sodium chloride solution, or a potassium chloride solution with a thickness approximately in a range between 30 μm and 250 μm. A seal structure 240 is formed on the peripheral region of the display device encapsulating the first substrate 210 and the second substrate 230. A common electrode 232 contacts the second fluid 226. The surface of the transparent polar fluid 226 approaches the hydrophobic layer 216 due to the electrical field generated between the common electrode 232 and the electrodes 212 in each sub-pixel region. The non-polar fluid is pushed away from the pixel electrodes 212 and becomes cohered; thereby rendering display images. Specifically, whether the ambient light passing through the display device is reflected or absorbed can be controlled due to shrinkage or stretching of the color non-polar fluids in each sub-pixel. Different colored sub-pixels can be separately driven to display desired colors in each pixel; thereby achieving full-color display effect.

Figure 5C:
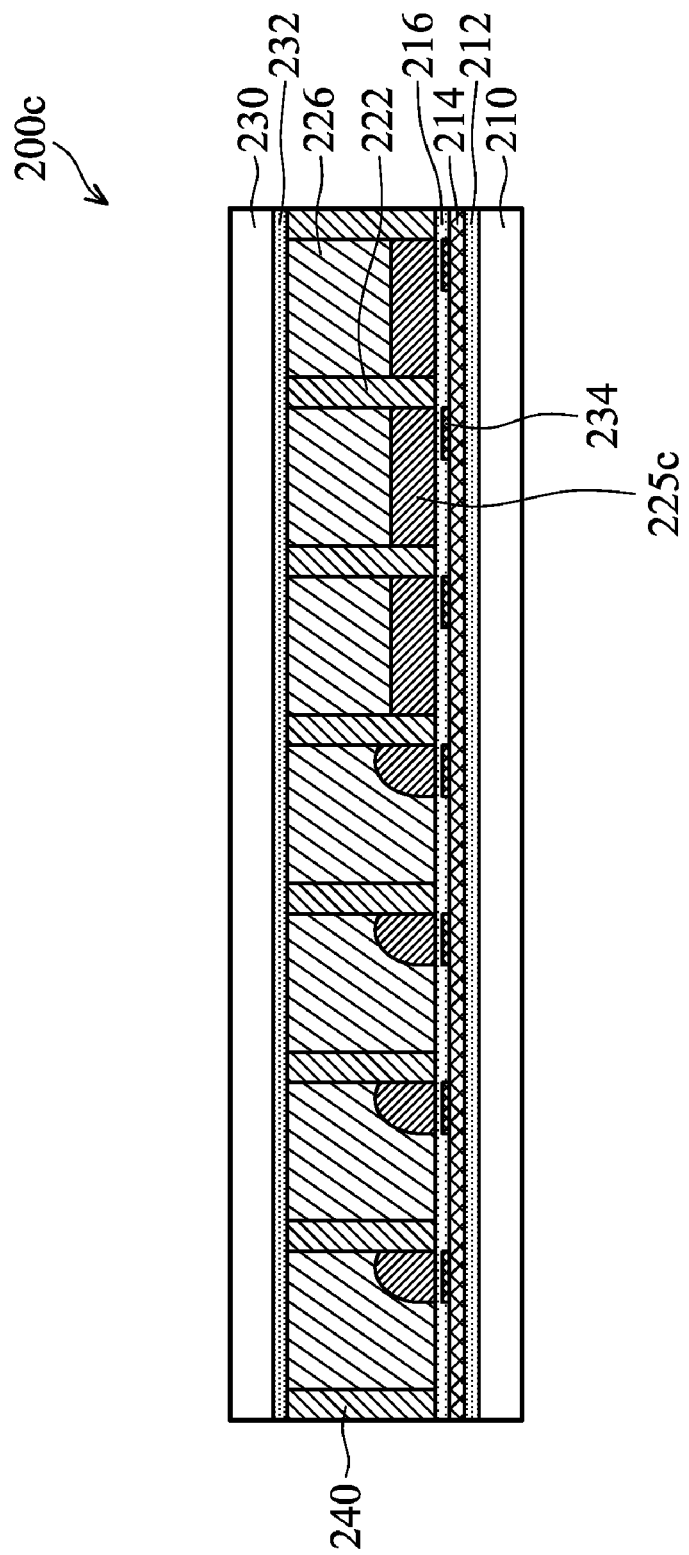

FIG. 5C is a cross section illustrating another embodiment of an electrowetting device 200c of the present disclosure. The electrowetting device 200c is nearly identical to the electrowetting device 200b of FIG. 5B and for simplicity its detailed description is omitted. The electrowetting device 200c is different from the electrowetting device 200b in that the partition structure 222 extensively contacts the second substrate structure 240.

Figure 5D:
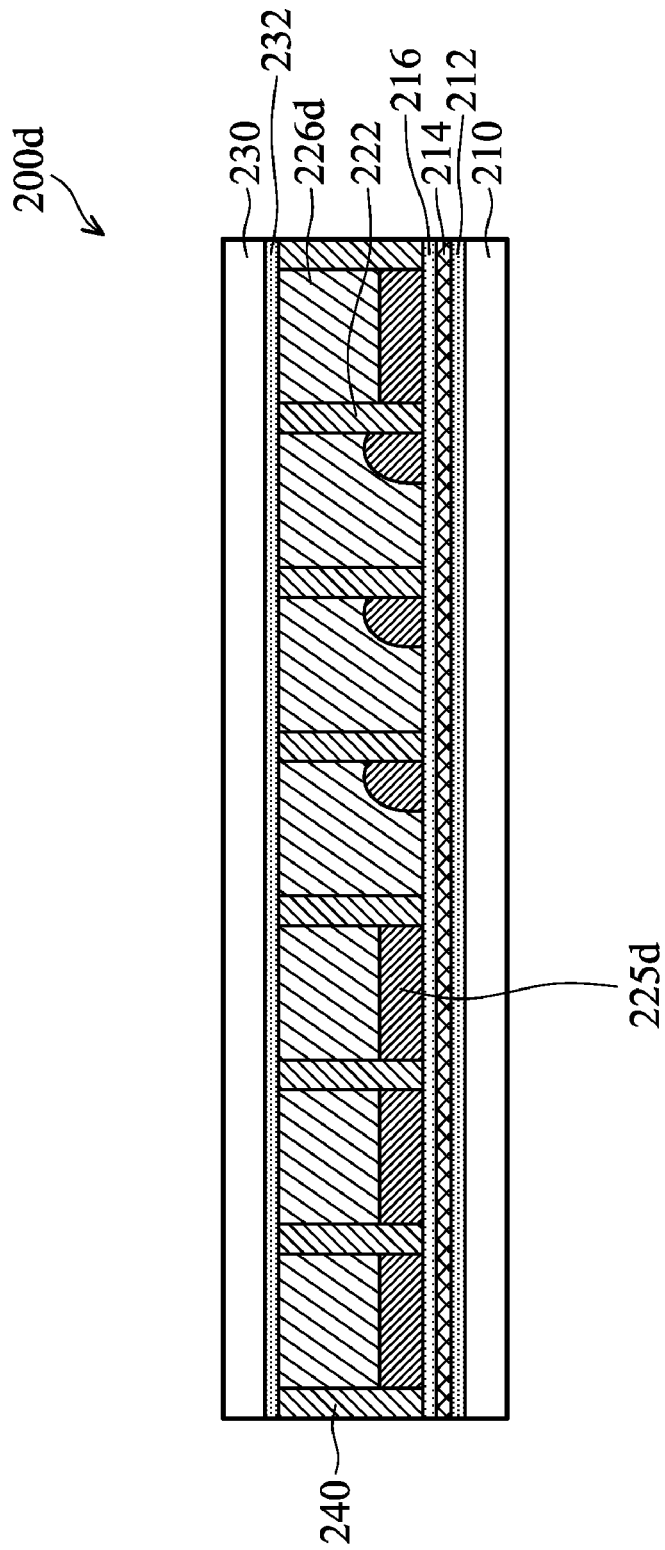

FIG. 5D is a cross section illustrating another embodiment of an electrowetting device 200d of the present disclosure. The electrowetting device 200d is nearly identical to the electrowetting device 200c of FIG. 5C and for simplicity its detailed description is omitted. The electrowetting device 200d is different from the electrowetting device 200c in that a white pigment is doped in the non-polar fluid layers 225d while the dyes and/or pigments and the luminescence substances are doped in the polar fluid layers 226d. Note that the non-polar fluid layer contains white media which can homogenously reflect each wavelength of light.

Figure 5E:
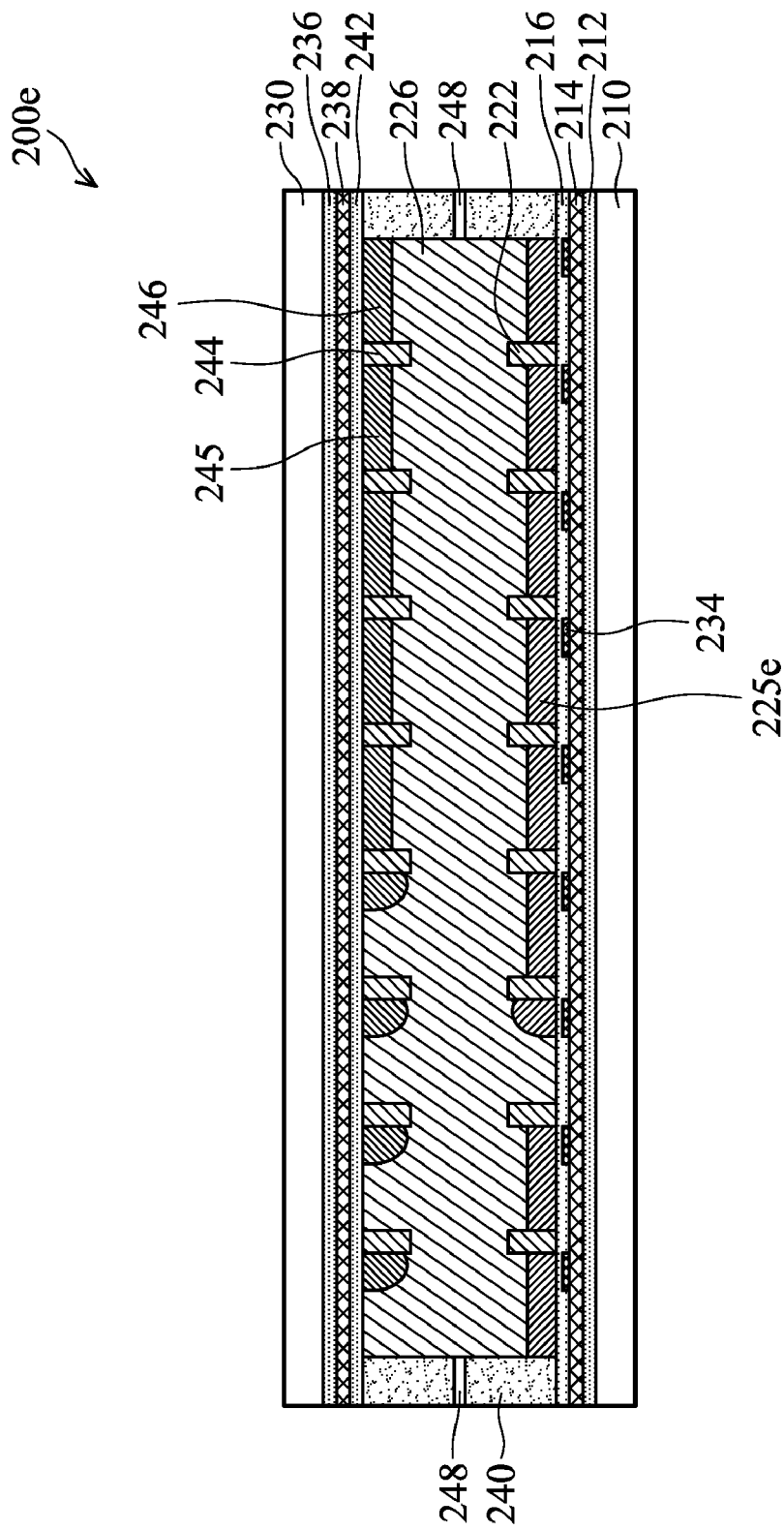

FIG. 5E is a cross section illustrating another embodiment of an electrowetting device 200e of the present disclosure. Referring to FIG. 5E, a single-layered color electrowetting device 200e includes a first substrate (lower substrate) 210 and a second substrate (upper substrate) 230 opposing to each other. The first substrate 210 includes first pixel electrodes 212 corresponding to each of sub-pixel regions. A first dielectric layer 214 is disposed on the first pixel electrode 212. Moreover, a first hydrophobic layer 216 can be further disposed on the first dielectric layer 214 to create a hydrophobic surface thereon. The first hydrophobic layer 216 can be made of a fluorine-containing hydrophobic polymer or a carbide-containing hydrophobic polymer, with a thickness approximately in a range between 0.1 μm and 1 μm.

The second substrate 230 includes second pixel electrodes 236 corresponding to each of sub-pixel regions. A second dielectric layer 238 is disposed on the second pixel electrode 212. Moreover, a second hydrophobic layer 242 can be further disposed on the second dielectric layer 238 to create a hydrophobic surface thereon. A second partition structure 244 is disposed on the second hydrophobic layer 242; thereby defining an array of multiple sub-pixels.

A first partition structure 222 is disposed on the first hydrophobic layer 216; thereby defining an array of multiple sub-pixels. The first partition structure 222 can be made of a hydrophilic photoresist with a thickness approximately in a range between 5 μm and 10 μm. A plurality of first non-polar fluid layers 225e corresponding to different colors are disposed on the first hydrophobic layer 216 of each sub-pixel region. A plurality of second non-polar fluid layers 246 corresponding to different colors are disposed on the second hydrophobic layer 242 of each sub-pixel region. The non-polar fluid layers can be made of decane, dodecane, or tetradecane, with a thickness approximately in a range between 1 μm and 10 μm. Alternatively, the first non-polar fluid layers 225e include primary colors (such as RGBK or CYMK) of dyes and/or pigments, and the second non-polar fluid layers 246 include primary colors of luminescence substance. Luminescence substances can also be doped in the first non-polar fluid layers 225e, while the dyes and/or pigments substances can be doped in the second non-polar fluid layers 246. A light shield layer 234 (e.g., a black matrix layer) is disposed underlying a shrunken area of the non-polar fluid layer. A transparent polar fluid 226 is filled between the first substrate 230 and the second substrate 210. The transparent polar fluid layer 226 can be made of water, a sodium chloride solution, or a potassium chloride solution with a thickness approximately in a range between 30 μm and 250 μm. A seal structure 240 is formed on the peripheral region of the display device encapsulating the first substrate 210 and the second substrate 230. A common electrode 248 is inserted through the seal structure 240 and contacts the second fluid 226. The surface of the transparent polar fluid 226 approaches the first and second hydrophobic layers 216 and 242 due to the electrical field generated between the common electrode 248 and the first and second electrodes 212 and 236 in each sub-pixel region. The non-polar fluid is pushed away from the pixel electrodes 212, 236 and becomes cohered; thereby rendering display images. Specifically, whether the ambient light passing through the display device is reflected or absorbed can be controlled due to shrinkage or stretching of the color non-polar fluids in each sub-pixel. Different colored sub-pixels can be separately driven to display desired colors in each pixel; thereby achieving full-color display effect.

Figure 5F:
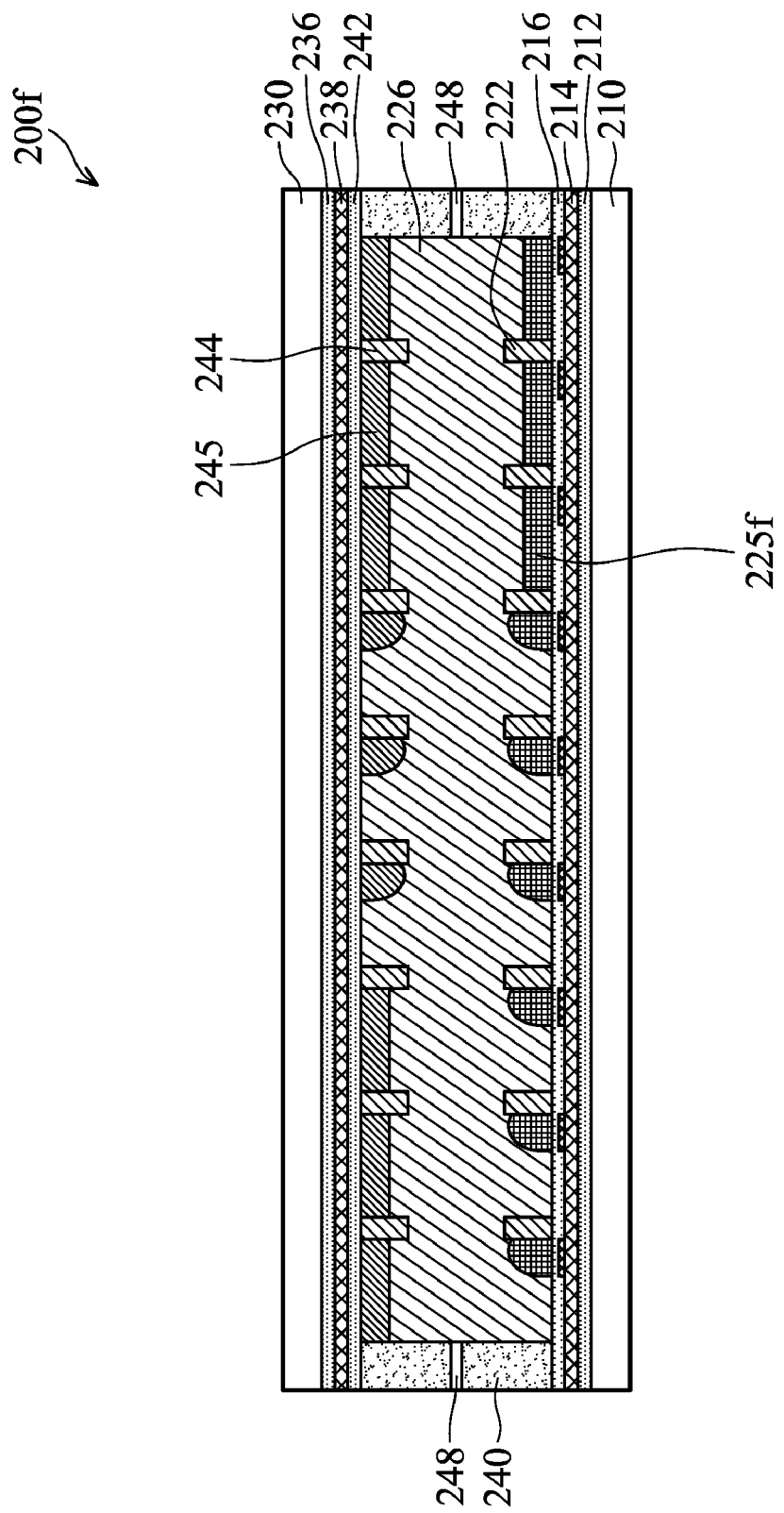

FIG. 5F is a cross section illustrating another embodiment of an electrowetting device 200f of the present disclosure. The electrowetting device 200f is nearly identical to the electrowetting device 200e of FIG. 5E and for simplicity its detailed description is omitted. The electrowetting device 200f is different from the electrowetting device 200e in that a black pigment and/or dye is doped in the first non-polar fluid layers 225f while both the colored dyes and/or pigments and the luminescence substances are doped in the second non-polar fluid layers 246.

Figure 5G:
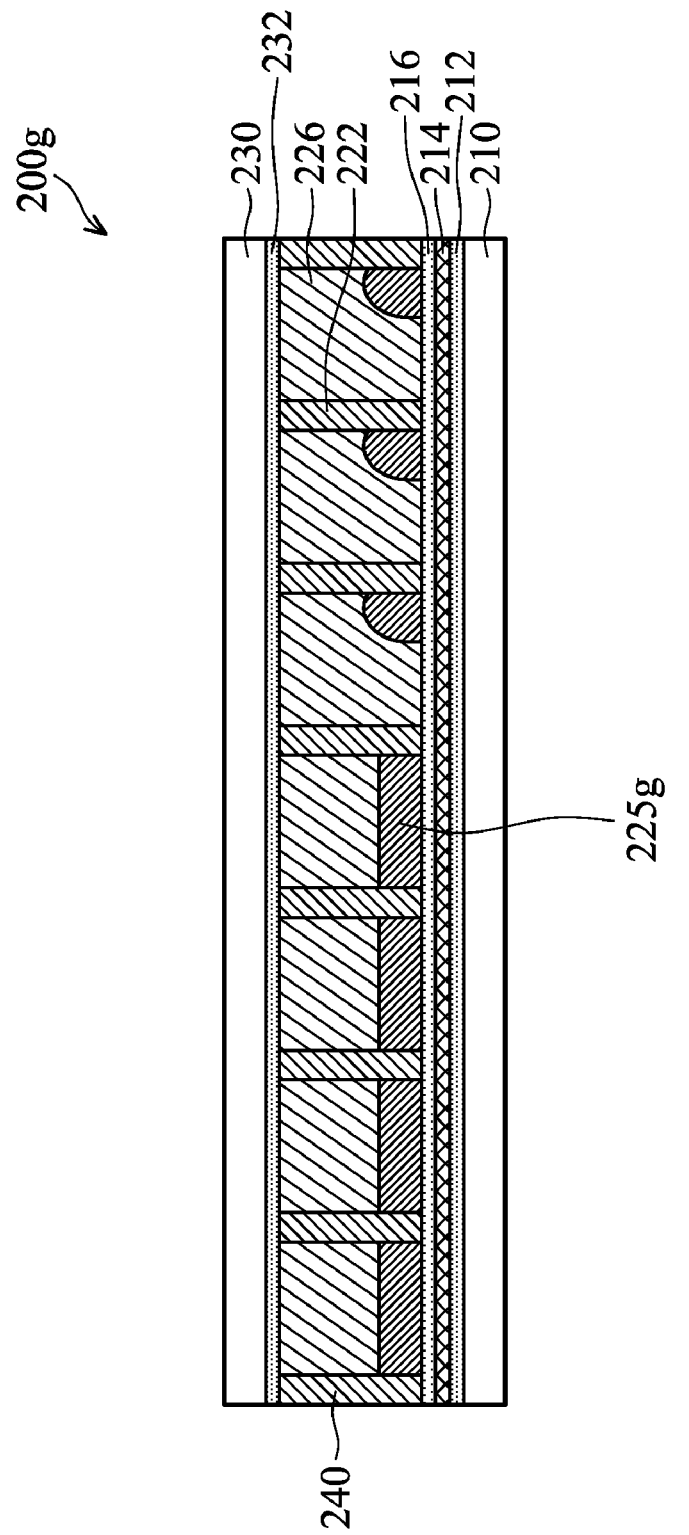

FIG. 5G is a cross section illustrating another embodiment of an electrowetting device 200g of the present disclosure. The electrowetting device 200g is nearly identical to the electrowetting device 200c of FIG. 5C and for simplicity its detailed description is omitted. The electrowetting device 200g is different from the electrowetting device 200c in that dye and/or pigment substances are doped in the non-polar fluid layers 225g while luminescence substances are doped in the polar fluid layers 226g. Note that a color of the dye and/or pigment in the non-polar fluid layer 225g and a color of the luminescence substance in the polar fluid layer 226g are complementary colors (e.g., red and cyan, green and magenta, blue and yellow).

Figure 6A:
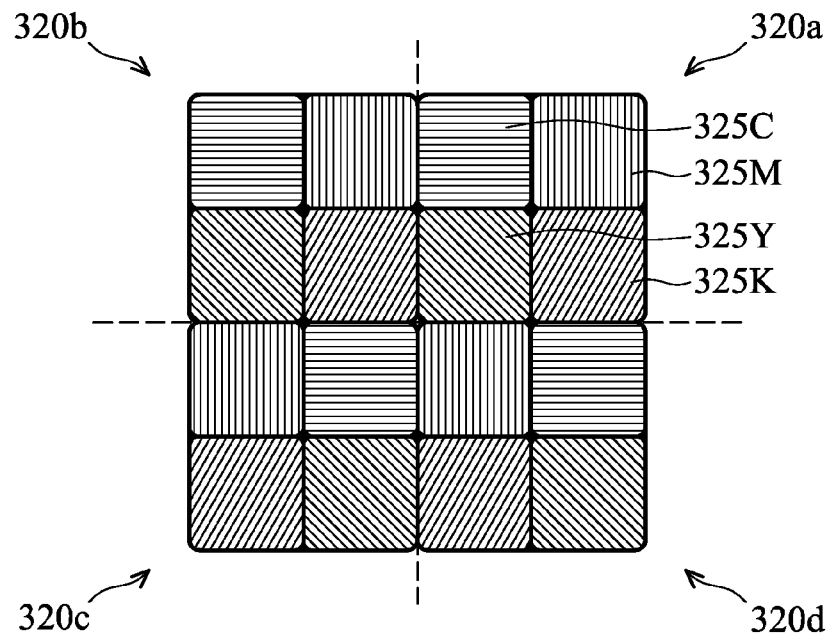
FIGS. 6A-6C are schematic diagrams illustrating changes in color of each pixel of an embodiment of the electrowetting device.
Figure 6B:
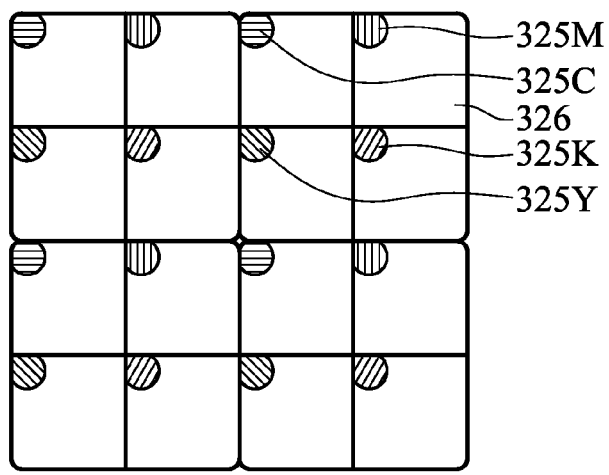
Figure 6C:
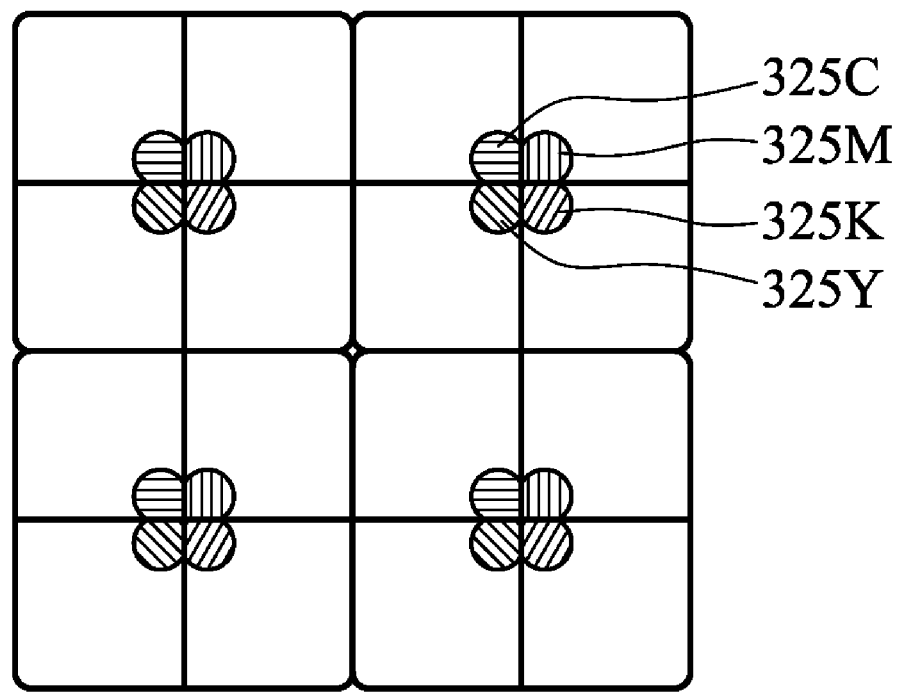

FIGS. 6A-6C are schematic diagrams illustrating changes in color of each pixel of an embodiment of the electrowetting device. Referring to FIG. 6A, the display pixels 320a-320d are arranged in a square array, separately corresponding to a cyan sub-pixel 325C, a yellow sub-pixel 325Y, a magenta sub-pixel 325M, and a black sub-pixel 325K. At a "dark" state, all of the color non-polar ink oils in each color sub-pixel are stretched. When a "bright" state is shown, the color non-polar ink oils in each color sub-pixel are coherently shrunk towards the same corer of each sub-pixel, exposing the underlying dielectric layer or reflective plate 326, as shown in FIG. 6B. In another embodiment, when a "bright" state is shown, the color non-polar ink oils in each color sub-pixel are coherently shrunk towards common corers among the adjacent sub-pixels, exposing the underlying dielectric layer or reflective plate, as shown in FIG. 6C.

Figure 7A:
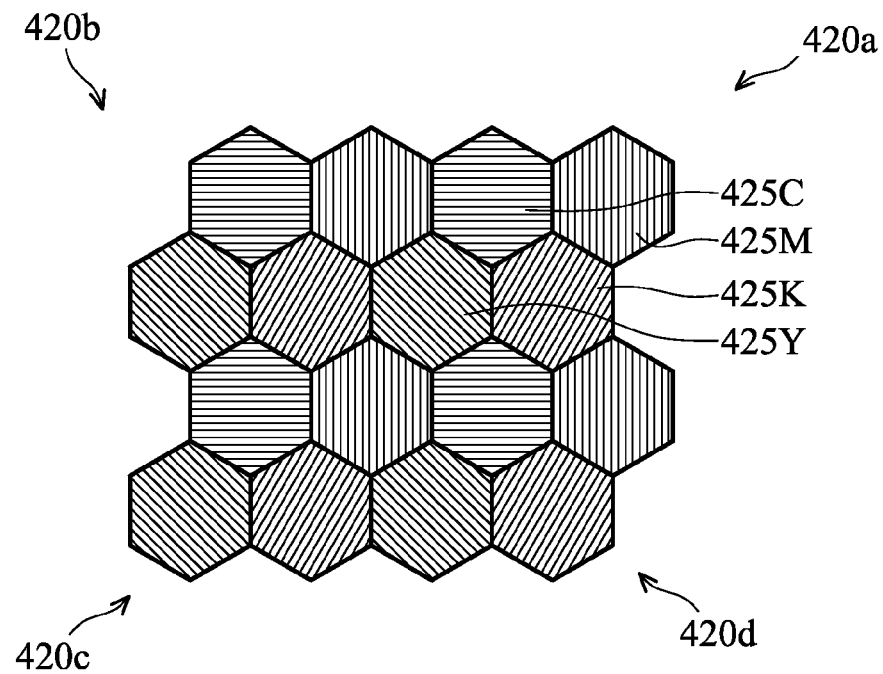
FIGS. 7A-7C are schematic diagrams illustrating changes in color of each pixel of another embodiment of the electrowetting device.
Figure 7B:
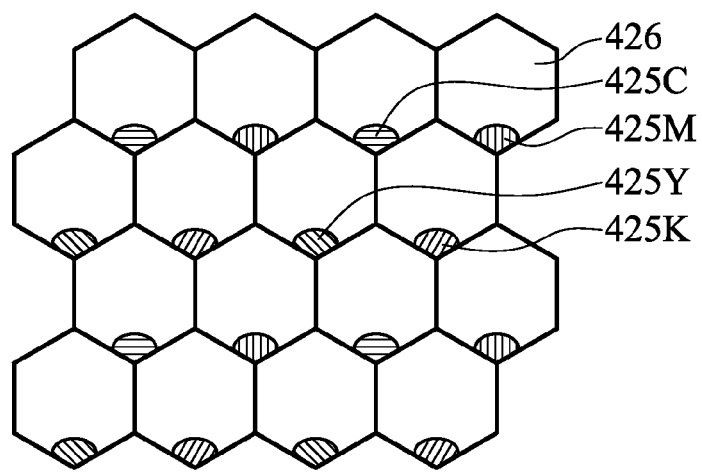
Figure 7C:
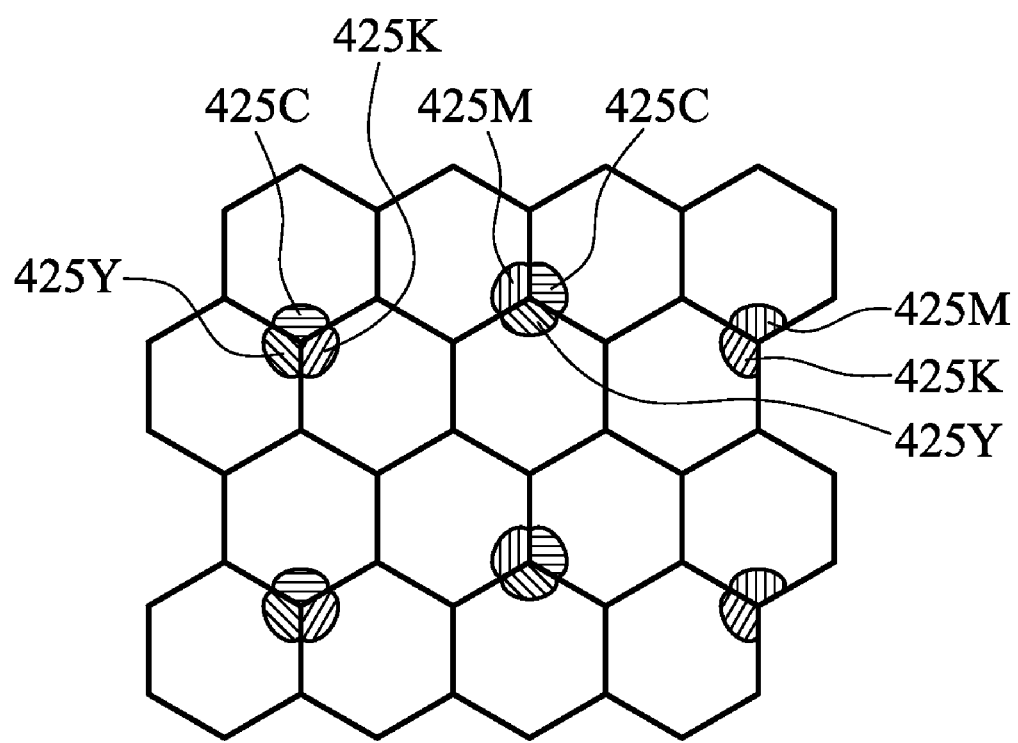

FIGS. 7A-7C are schematic diagrams illustrating changes in color of each pixel of another embodiment of the electrowetting device. Referring to FIG. 7A, the pixels 420a-420d are arranged in a hexagonal close packed array, separately corresponding to a cyan sub-pixel 425C, a yellow sub-pixel 425Y, a magenta sub-pixel 425M, and a black sub-pixel 425K. At a "dark" state, all of the color non-polar ink oils in each color sub-pixel are stretched. When a "bright" state is shown, the color non-polar ink oils in each color sub-pixel are coherently shrunk towards the same corer of each sub-pixel, exposing the underlying dielectric layer or reflective plate 426, as shown in FIG. 7B. In another embodiment, when a "bright" state is shown, the color non-polar ink oils in each color sub-pixel are coherently shrank towards common corers among the adjacent sub-pixels, exposing the underlying dielectric layer or reflective plate, as shown in FIG. 7C.

Figure 8A:
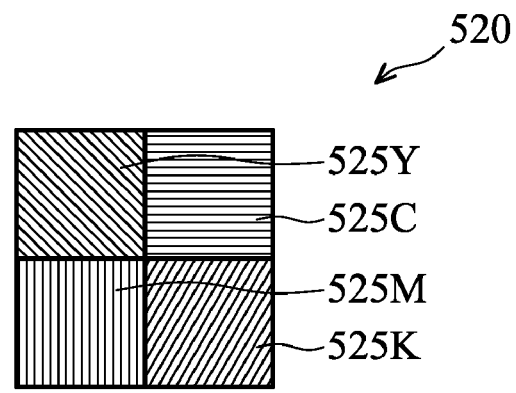
FIGS. 8A-8C are schematic diagrams illustrating changes in color of each sub-pixel of another embodiment of the electrowetting device.
Figure 8B:
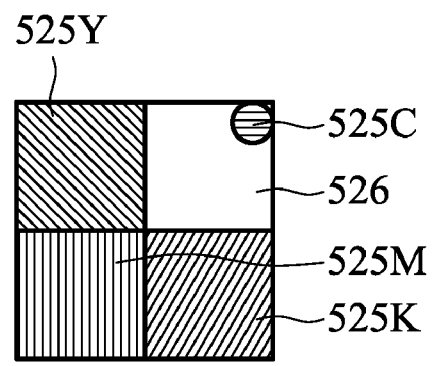
Figure 8C:
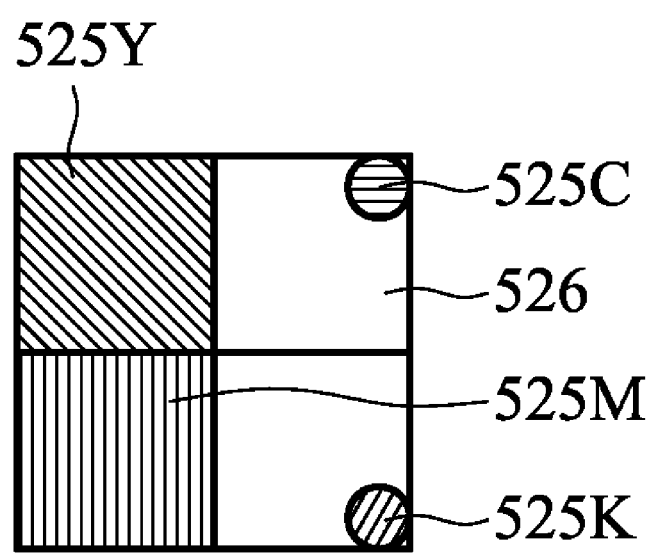

FIGS. 8A-8C are schematic diagrams illustrating changes in color of each sub-pixel of another embodiment of the electrowetting device. Referring to FIG. 8A, at a "dark" state, all of the color non-polar ink oils in each color sub-pixel 525C, 525Y, 525M, 525K, are stretched. Referring to FIG. 8B, when a "dark red" pixel is desired to be shown, the cyan sub-pixel 525C is driven, changing distribution of the cyan non-polar ink oil. The entity of the pixel 520 presents dark red. Referring to FIG. 8C, when a "bright red" pixel is desired to be shown, the cyan sub-pixel 525C and the black sub-pixel 525K are driven, changing distribution of the cyan and black non-polar ink oils. Thus, the pixel 520 is bright red.

Table I depicts relationships between the CYMK sub-pixels and desired colors presented by a display pixel. The distribution of the non-polar ink oils in each color sub-pixel is presented according to the desired shown pixel color.

TABLE I

| | Sub-pixel color | | | |
|---|---|---|---|---|
| Present color | Cyan | Yellow | Magenta | Black |
| Cyan | √ | | | |
| Dark Cyan | √ | | | √ |
| Yellow | | √ | | |
| Dark Yellow | | √ | | √ |
| Magenta | | | √ | |
| Dark Magenta | | | √ | √ |
| Black | √ | √ | √ | √ |
| Red | | √ | √ | |
| Dark red | | √ | √ | √ |
| Blue | √ | | √ | |
| Dark Blue | √ | | √ | √ |
| Green | √ | √ | | |
| Dark Green | √ | √ | | √ |

Figure 9A:
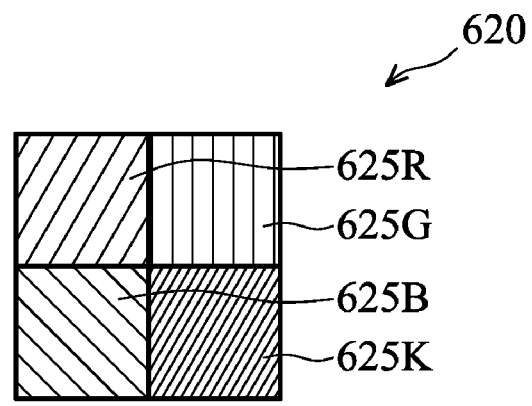
FIGS. 9A-9C are schematic diagrams illustrating changes in color of each sub-pixel of another embodiment of the electrowetting device.
Figure 9B:
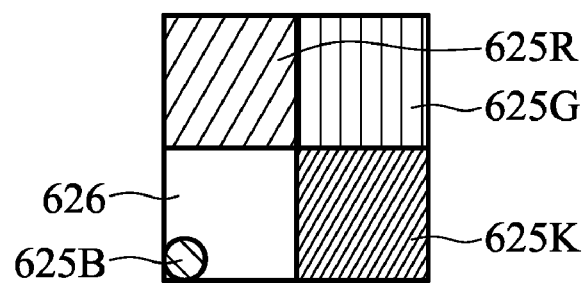
Figure 9C:
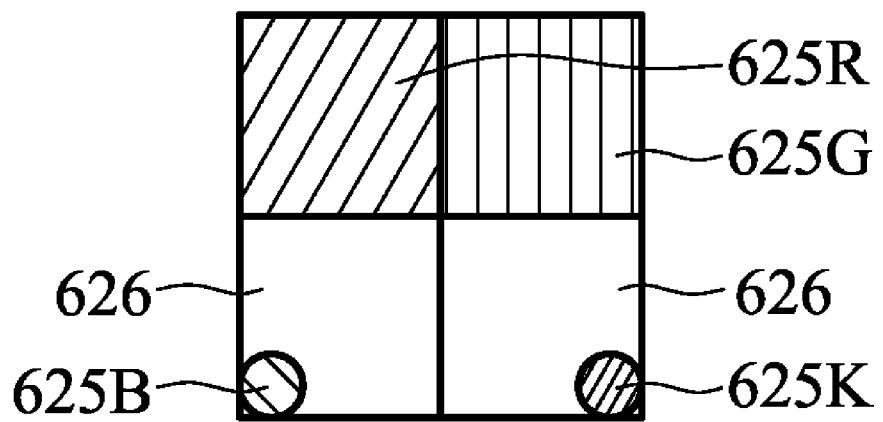

FIGS. 9A-9C are schematic diagrams illustrating changes in color of each sub-pixel of another embodiment of the electrowetting device. Referring to FIG. 9A, at a "dark" state, all of the color non-polar ink oils in each color sub-pixel 625R, 625G, 625B, and 525K in the pixel 620 are stretched. Referring to FIG. 9B, when a "dark yellow" pixel is desired to be shown, the blue sub-pixel 625B is driven, changing distribution of the blue non-polar ink oil. The entity of the pixel 620 presents dark yellow. Referring to FIG. 9C, when a "bright yellow" pixel is desired to be shown, the blue sub-pixel 625B and the black sub-pixel 625K are driven, changing distribution of the blue and black non-polar ink oils. The entity of the pixel 620 presents bright yellow.

Table II depicts relationships between the RGBK sub-pixels and desired colors presented by a display pixel. The distribution of the non-polar ink oils in each color sub-pixel is presented according to the desired shown pixel color.

TABLE II

| | Sub-pixel color | | | |
|---|---|---|---|---|
| Present color | Red | Green | Blue | Black |
| Cyan | | √ | √ | |
| Dark Cyan | | √ | √ | √ |
| Yellow | √ | √ | | |
| Dark Yellow | √ | √ | | √ |
| Magenta | √ | | √ | |
| Dark Magenta | √ | | √ | √ |
| Black | √ | √ | √ | √ |
| Red | √ | | | |
| Dark red | √ | | | √ |
| Blue | | | √ | |
| Dark Blue | | | √ | √ |
| Green | | √ | | |
| Dark Green | | √ | √ | |

While the invention has been described by way of example and in terms of the several embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electrowetting device, comprising:
   a first substrate and an opposing second substrate with a polar fluid layer and a non-polar fluid layer interposed therebetween;
   a first electrode disposed on the first substrate;
   a second electrode disposed on the second substrate;
   a first partition structure disposed on the first substrate, to define a plurality of sub-pixels;
   an array of pixel regions having a set of primary color sub-pixels, wherein each sub-pixel corresponds to one of the non-polar fluid layers with and each of the non-polar fluid layers is isolated from each other,
   a dye and/or a pigment doped in one of the polar fluid layer and the non-polar fluid layer;
   a luminescence substance doped in one of the polar fluid layer and the non-polar fluid layer; and
   a emission module disposed to the bottom of the device.

2. The electrowetting device as claimed in claim 1, wherein the colors of the non-polar fluid layer in the neighboring sub-pixels are different.

3. The electrowetting device as claimed in claim 1, wherein the luminescence substance which has excited by light or other electromagnetic radiation.

4. The electrowetting device as claimed in claim 1, wherein a main wavelength of the emission module is less than 500 nm.

5. The electrowetting device as claimed in claim 1, wherein the partition structure shields the luminescence substance.

6. The electrowetting device as claimed in claim 1, further comprising a light shield layer disposed underlying a shrunken area of the non-polar fluid layer.

7. The electrowetting device as claimed in claim 6, wherein the dye and/or pigment and the luminescence substance are doped in the non-polar fluid layer.

8. The electrowetting device as claimed in claim 1, wherein the partition structure extensively contacts the second substrate.

9. The electrowetting device as claimed in claim 8, wherein the dye and/or pigment and the luminescence substance are doped in the non-polar fluid layer.

10. The electrowetting device as claimed in claim 8, wherein the dye and/or pigment is doped in the non-polar fluid layer, and the luminescence substance is doped in the polar fluid layer, wherein a color of the dye and/or pigment in the non-polar fluid layer and a color of the luminescence substance in the polar fluid layer are complementary colors.

11. The electrowetting device as claimed in claim 1, wherein a molar concentration of the dye and/or pigment is less than a molar concentration of the luminescence substance.

12. The electrowetting device as claimed in claim 1, wherein the non-polar fluid layer contains white media which reflect each wavelength of light.

13. The electrowetting device as claimed in claim 12, wherein the dye and/or pigment and the luminescence substance are doped in the polar fluid layer.

14. The electrowetting device as claimed in claim 1, wherein the emission module is an active light source emits light with a wavelength of less than 500 nm.

15. The electrowetting device as claimed in claim 1, wherein the emission module includes a waveguide module, wherein a light source emits light from a lateral side of the waveguide module reflected from the shrunken area of the non-polar fluid layer, and is effectively transmitted to the polar fluid layer.

16. The electrowetting device as claimed in claim 1, wherein the opposing second substrate comprises:

the second electrode covered by a dielectric layer;
a second non-polar fluid layer disposed on the second dielectric layer; and
a second partition structure disposed on the second substrate, to define and correspond to the plurality of sub-pixels.

17. The electrowetting device as claimed in claim 16, wherein the dye and/or pigment is doped in the non-polar fluid layer of the first substrate, and the luminescence substance is doped in the second non-polar fluid layer of the second substrate.

18. The electrowetting device as claimed in claim 16, wherein a black dye and/or pigment is doped in the non-polar fluid layer of the first substrate, and both the dye and/or pigment and luminescence substance are doped in the second non-polar fluid layer of the second substrate.

19. The electrowetting device as claimed in claim 1, further comprising a control module switching between transmission, reflection, and self-emission display modes of the electrowetting device.

* * * * *